United States Patent
Li et al.

(10) Patent No.: US 8,595,701 B2
(45) Date of Patent: *Nov. 26, 2013

(54) SYMBOLIC EXECUTION AND TEST GENERATION FOR GPU PROGRAMS

(75) Inventors: Guodong Li, San Jose, CA (US); Sreeranga P. Rajan, Sunnyvale, CA (US); Indradeep Ghosh, Cupertino, CA (US)

(73) Assignee: Fujitsu Limited, Kawasaki-shi (JP)

( * ) Notice: Subject to any disclaimer, the term of this patent is extended or adjusted under 35 U.S.C. 154(b) by 305 days.

This patent is subject to a terminal disclaimer.

(21) Appl. No.: 13/021,604

(22) Filed: Feb. 4, 2011

(65) Prior Publication Data

US 2012/0204154 A1    Aug. 9, 2012

(51) Int. Cl.
G06F 9/44    (2006.01)

(52) U.S. Cl.
USPC ............ 717/124; 717/118; 717/126; 717/127

(58) Field of Classification Search
None
See application file for complete search history.

(56) References Cited

U.S. PATENT DOCUMENTS

| | | | | |
|---|---|---|---|---|
| 5,325,530 | A * | 6/1994 | Mohrmann .................... | 717/124 |
| 5,367,685 | A * | 11/1994 | Gosling ........................ | 717/148 |
| 7,231,632 | B2 * | 6/2007 | Harper .......................... | 717/109 |
| 7,614,041 | B2 * | 11/2009 | Harper .......................... | 717/120 |
| 7,707,388 | B2 * | 4/2010 | Vishkin ......................... | 712/207 |
| 7,945,898 | B1 * | 5/2011 | Episkopos et al. ............. | 717/124 |
| 7,958,498 | B1 * | 6/2011 | Brown et al. .................. | 717/139 |
| 8,127,280 | B2 * | 2/2012 | Thomas et al. ................ | 717/136 |
| 2005/0229044 | A1 * | 10/2005 | Ball ............................... | 714/38 |
| 2008/0082968 | A1 * | 4/2008 | Chang et al. .................. | 717/128 |
| 2010/0125836 | A1 * | 5/2010 | Sazegari et al. ............... | 717/151 |
| 2011/0030061 | A1 * | 2/2011 | Artzi et al. ..................... | 726/25 |
| 2012/0065956 | A1 * | 3/2012 | Irturk et al. .................... | 703/21 |
| 2012/0084759 | A1 * | 4/2012 | Candea et al. ................ | 717/126 |
| 2012/0185731 | A1 * | 7/2012 | Barman et al. ............... | 714/38.1 |
| 2013/0042123 | A1 * | 2/2013 | Smith et al. ................... | 713/300 |

OTHER PUBLICATIONS

Title: Depiction and playout of multi-threaded program executions, author: Roychoudhury, A. ; Publication Year: 2003.*
Title: A method for testing software systems based on state design pattern using symbolic execution, author: Cristina Tudose et al, dated:2010.*
Search Report for EP 12153888, Jun. 27, 2012.
Cadar, C., et al., "KLEE: Unassisted and Automatic Generation of High-Coverage Tests for Complex Systems Programs," *OSDI '08 Proceedings of the 8th USENIX Conference on Operating Systems Design and Implementation*, pp. 209-224, Dated: Dec. 2008, 2010.
Cui, H., et al., "Stable Deterministic Multithreading through Schedule Memoization," *Proceedings of the Ninth Symposium on Operating Systems Design and Implementation*, pp. 1-15, Oct. 2010.
Li, G., "A Short Tutorial of CKLEE for CUDA (Version 0.01)*," http://www.cs.utah.edu/formal_verification/mediawiki/images/e/e5/GKLEE_Tutorial, pp. 1-8, Dated: Nov. 3, 2010.
Zamfir, C., et al., "Execution Synthesis: A Technique for Automated Software Debugging," *Proceedings of the 5th European Conference on Computer Systems, Eurosys '10*, pp. 321-334. Dated: Jan. 1, 2010.

* cited by examiner

*Primary Examiner* — Chameli Das
(74) *Attorney, Agent, or Firm* — Baker Botts L.L.P.

(57) ABSTRACT

In particular embodiments, a method includes accessing bytecode generated by a compiler from a software program for execution by a particular processing unit; accessing configuration information describing one or more aspects of the particular processing unit; symbolically executing the bytecode with the configuration information; and, based on the symbolic execution, generating one or more results conveying a functional correctness of the software program with respect to the particular processing unit for communication to a user and generating one or more test cases for the software program for communication to a user.

28 Claims, 7 Drawing Sheets

SYMBOLIC EXECUTION AND TEST GENERATION FOR GPU PROGRAMS

TECHNICAL FIELD

This disclosure relates generally to Graphical Processing Unit (GPU) programs.

BACKGROUND

GPUs may yield spectacular performance on many important computing applications. However, writing efficient GPU kernels often requires painstaking manual optimization efforts, which are often error prone.

DESCRIPTION OF EXAMPLE EMBODIMENTS

Particular embodiments provide a symbolic execution methodology for GPU programs. Instrumentation-based runtime tools cannot accept open inputs and generate test cases, and static-analysis-based tools suffer from false alarms and inefficiency. In contrast, particular embodiments use symbolic execution to implement a more accurate, efficient, and user-friendly validation tool and test generator for GPU programs.

Herein, reference to a "GPU program" may encompass one or more software programs that one GPUs may execute, where appropriate. This disclosure contemplates any suitable GPU program. Reference to a "GPU" may encompass a specialized microprocessor that offloads and accelerates graphics rendering from a central processing unit (CPU), where appropriate. This disclosure contemplates any suitable GPU. Embedded systems, mobile phones, personal computers, workstations, and game consoles may use GPUs. A GPU may be efficient at manipulating computer graphics and may have a highly parallel structure that makes it more effective than a general-purpose CPU for a range of complex algorithms. A GPU may be present on a video card, a motherboard, or a CPU die.

Particular embodiments provide a symbolic executor of GPU programs. This disclosure may refer to the symbolic executor (or tool) as "CKLEE." In particular embodiments CKLEE symbolically executes real-world CPU+GPU programs, performs sanity checks, and automatically generates test cases with high coverage guarantee. Based on Satisfiability Modulo Theories (SMT) solving, CKLEE may in particular embodiments detect bugs, such as data races, incorrectly synchronized barriers, and property violation for open inputs, as well as produce high-quality inputs that can be used to test the kernels in real settings.

Figure 1:
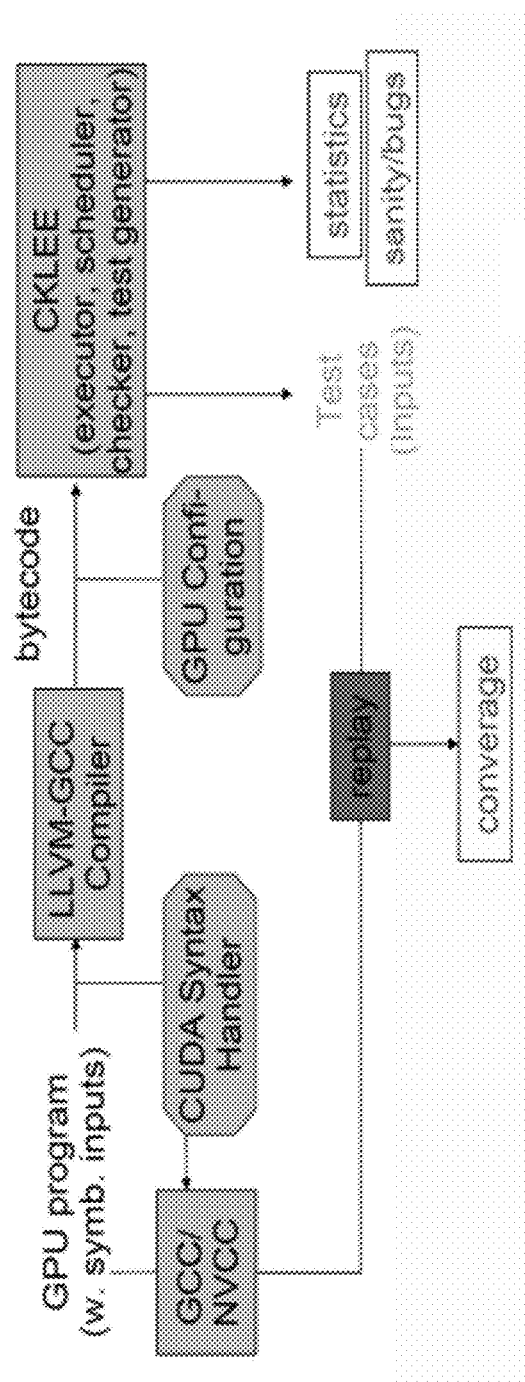
FIG. 1 illustrates an example flow for symbolic execution and test generation for a GPU program.

FIG. 1 illustrates an example flow for symbolic execution and test generation for a GPU program. A GPU program, along with a driver, is compiled into Low Level Virtual Machine (LLVM) bytecode, which CKLEE interprets for symbolic execution. Particular embodiments extend the LLVM-GNU Compiler Collection (GCC) compiler to handle GPU program syntax. After the execution, statistics information, such as bytecode coverage, may be given. In particular embodiments, one output is about sanity and functional correctness (if defined). Another output is the test cases, which may be replayed to produce coverage information.

In particular embodiments, CKLEE is built on KLEE, which can handle only sequential C programs. In particular embodiments, CKLEE extends symbolic virtual machine to handle concurrent programs (e.g. Compute Unified Device Architecture (CUDA) kernels). It augments the symbolic state to model CUDA's memory hierarchy. To handle multithreaded programs, CKLEE's interpreter applies deterministic thread scheduling with sanity checking for concurrency bugs. Particular embodiments extend KLEE, at least in part, by introducing a new executor, a new scheduler, a new checker, and a revised test generator for concurrent programs running in GPUs.

Figure 2:
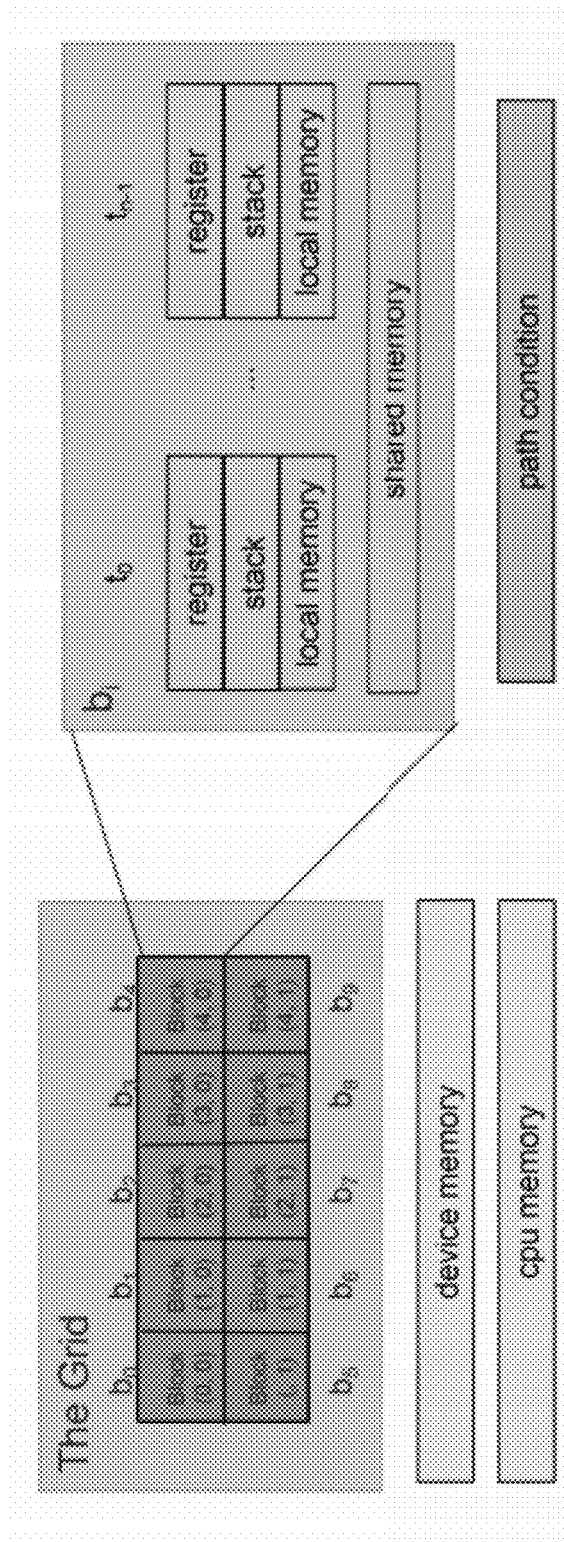
FIG. 2 illustrates an example symbolic state of an example GPU.

FIG. 2 illustrates an example symbolic state of an example GPU. Particular embodiments apply memory-type inference in the bytecode level to infer which memory an access will read or write. Particular embodiments perform deadlock and race check in a barrier-over-barrier manner. For race-free programs, particular embodiments pick an arbitrary schedule to avoid redundant schedules. In particular embodiments, this schedule-reduction algorithm need investigate only one schedule per barrier interval. Particular embodiments check deadlocks by counting the number of barriers each thread encounters and check races by read set/write set analysis. Particular embodiments produce test cases for each valid path of a GPU program running a multiple threads.

Particular embodiments are able to symbolically execute and validate CUDA programs running in GPUs. By modeling the GPU in the software and keeping sufficient low level details, particular embodiments are able to discover real bugs and programming issues in real GPU programs substantially without false alarms. In particular embodiments, it is possible to achieve high test coverage for the these programs. Particular embodiments incur low overhead compared with instrumentation-based dynamic checkers. Particular embodiments may be part of a C/C++ validation tool, which may be offered as a cloud-computing service.

When properly programmed, a GPU can yield anywhere from 20 to 100 times better performance than standard CPU-based multi-cores. However, obtaining this performance requires almost heroic acts of programming. For example, it may be necessary to keep all fine-grained GPU threads busy. It may also be necessary to ensure coalesced data movements from the global memory (accessed commonly by the CPU and GPU) to the shared memory (accessed commonly by the GPU threads). It may also be necessary to minimize bank conflicts when the GPU threads step through the shared memory. Data races and incorrect barrier placements are frequently introduced during CUDA programming. Moreover, even if these errors are absent, it is often still difficult to guarantee the functional correctness of a kernel, especially when the behavior of the kernel is platform/hardware dependent. One solution is to use automatically generated test cases to test the kernel on real GPU hardware or official simulators. These test cases should guarantee high coverage such that as many as lines and paths are executed using as few as test cases.

There are few tools available to verify and thoroughly test CUDA programs. Emulators that come with GPUs typically assume concrete inputs and execute only a minuscule portion of all possible behaviors. Bugs often escape, either crashing or deadlocking the GPU hardware, often requiring a hardware reboot. In addition, even when a program is functionally correct, it may still need to be tested on hardware for performance evaluation. The challenge is often that producing a good set of concrete test cases is time-consuming and may even be impossible to do manually.

Particular embodiments provide a tool based on symbolic execution to verify and assist the testing of CUDA programs. In particular embodiments, the tool is end-to-end; does not limit the syntax of the source program; does not require the user to alter the source program; does not report false alarms; and can produce and replay test cases.

In particular embodiments, GPU kernels are made up of light-weight threads. Their Single Instruction Multiple Data (SIMD) organization bears little resemblance to thread programs written in C/Java, with their heterogeneous and heavyweight threads and use of synchronization primitives such as locks/monitors.

In particular embodiments, CKLEE takes a kernel program written in C/C++ along with a simple driver invoking this kernel as input. The arguments of this kernel are marked to have symbolic values (i.e. open inputs). CKLEE uses the LLVM-GCC compiler to parse the kernel, generates LLVM bytecode, and then runs the symbolic executor to the configuration information supplied (e.g. the block size). During execution, it may perform race and synchronization checking. It may also generate a set of path conditions represented as logical formulas. When the execution is done, these conditions may be processed by an SMT solver (such as, for example, the STP constraint solver) for satisfiability checking. A concrete solution returned by the solver constitutes a test case. Particular embodiments may use these test cases to run the kernels (compiled by GCC or NVCC) and collect coverage information about the source kernel.

In particular embodiments, CKLEE employs a C/C++ front-end based on LLVM-GCC (with customized extensions) to parse CUDA syntax. In particular embodiments, CKLEE handles virtually all front-end features including: struct, class, template, pointer, inheritance, CUDA's variable and function derivatives, CUDA specific functions, etc. In particular embodiments, CKLEE supports the execution of both CPU code and GPU code. Particular embodiments model the symbolic state (recording the execution status of a kernel) with respect to CUDA's memory hierarchy. Particular embodiments may model all possible concurrent interleavings. In particular embodiments, the existence of conflicts on shared variable accesses can be checked over just one canonical interleaving. Particular embodiments scale this up by analyzing one barrier interval (the portion before and after_syncthreads( )) at a time. In particular embodiments, this divide-and-conquer approach may improve efficiency.

Particular embodiments provide a way to check, during symbolic execution, whether all barriers are well synchronized and no races occur despite the presence of symbolic values. Particular embodiments also check the degree of a performance "bug"—bank conflicts—during the execution. In particular embodiments, the number of states and generated test cases can become extremely high for programs containing extensive branches—especially when the branches are within nested loops. Particular embodiments apply reduction techniques to cut similar paths while keeping more important ones to maintain higher coverage. Particular embodiments calculate coverage information on both the bytecode and the source code. Particular embodiments also calculate coverage pertaining to individual threads.

In particular embodiments, CKLEE does not generate false alarms (false bug reports), since it builds a precise symbolic model of the program. In addition to checking sanity and functional correctness, particular embodiments may also determine what configurations (e.g. the block size) are valid. For example, particular embodiments assure that the Bitonic Sort kernel in CUDA Software Development Kit (SDK) 2.0 works only when the block size is a power of two. In particular embodiments, CKLEE is able to reveal such undocumented assumptions.

In particular embodiments, a CUDA kernel is launched as an 1D or 2D grid of thread blocks. The total size of a 2D grid is gridDim.x×gridDim.y. The coordinates of a (thread) block are ⟨blockIdx.x, blockIdx.y⟩. The dimensions of each thread block are blockDim.x and blockDim.y. Each block contains blockDim.x×blockDim.y threads, each with coordinates ⟨threadIdx.x, threadIdx.y⟩. These threads can share information via shared memory and synchronize via barriers (_syncthreads( )). Threads belonging to distinct blocks must use the much slower global memory to communicate and may not synchronize using barriers.

The values of gridDim and blockDim determines the configuration of the system, e.g. the sizes of the grid and each block. For a thread, blockIdx and threadIdx give its block index in the grid and its thread index in the block respectively. For brevity purposes, particular embodiments use gdim, bid, bdim, and tid for gridDim, blockIdx, blockDim, and threadIdx, respectively. Constraints bid.*<gdim.* for *∈{x, y} and tid.*<bdim.* for *∈{x, y, z} always hold.

The following is an example CPU program and a CUDA kernel for incrementing each element in array a by k. The CPU version uses a loop, while the CUDA one uses N threads to increment the elements in parallel. The arguments of the kernel are assumed to be in the CPU memory.

```
// CPU code
void increment_CPU(int *a, int* b, int k, int N) {
    for (int idx = 0; idx < N; idx++)
        b[idx] = a[idx] + k;
}
// CUDA code
___global___ void increment_GPU(int *a, int *b, int k) {
    int idx = bid.x * bdim.x + tid.x;
    b[idx] = a[idx] + k;
}
```

The functional correctness of this CUDA kernel can be specified in a post-condition: $\forall i<N: b[i]=a[i]+k$. This property should hold for all valid configurations as well as all possible input values, which particular embodiments address.

Consider the "deadlock" kernel below. The threads satisfying tid.x+i>0 invoke the barrier call after increasing an element in v. They keep waiting other threads to reach the barrier. If there exists a thread that does not execute the barrier call, then a deadlock occurs. If condition tid.x+i>0 is satisfied by all threads or none of them at the same time, then there exit no deadlocks. Thus particular embodiments will need to enumerate, for each thread, the cases of both tid.x+i>0 and tid.x+i≤0 for thorough testing. Random testing might miss this bug since it is not directed by the condition. Particular embodiments use a symbolic method that covers all the cases.

```
___shared___ int v[1000];
___global___ void deadlock(int i) {
    if (tid.x + i > 0)
        { v[tid.x]++; ___syncthreads( ); }
}
```

-continued

```
__global__ void race( ) {
    v[tid.x] = v[(tid.x + 1) % bdim.x];
    __syncthreads( );
}
```

Now consider the "race" kernel where each thread updates an element in v which is supposed to be used by this thread exclusively. Thread 0 and thread bdim.x−1 may access v[0] simultaneously, thus incurring a race (i.e. the same location is accessed by two threads and at least one access is a write). Testing may fail to reveal this bug because (1) the bug emerges only when the write by one thread occurs before the read by the other thread; (2) the execution order of threads in GPU is non-deterministic depending on the scheduling; and (3) the memory access order is also dependent on the latency of memory accesses. In contrast, in particular embodiments, the symbolic executor and checker ensures to catch this bug through access set analysis.

The Bitonic Sort kernel (below) taken from CUDA SDK 2.0 sorts values' elements in an ascending order. This kernel coalesces global memory accesses, minimizes bank conflicts, avoids redundant barriers, and accelerates address indexing through bit operations. Without such hand-crafting steps, kernels such as this will perform poorly. After these optimizations, the code becomes difficult to understand, not to mention verifying its correctness.

```
    __shared__ unsigned shared[NUM];
    inline void swap(unsigned& a, unsigned& b) {
        unsigned tmp = a; a = b; b = tmp;
    }
    __global__ void BitonicKernel(unsigned* values) {
1:      unsigned int tid = tid.x;
2:      // Copy input to shared mem.
3:      shared[tid] = values[tid];
4:      __syncthreads( );
5:
6:      // Parallel bitonic sort.
7:      for (unsigned k = 2; k <= bdim.x; k *= 2)
8:          for (unsigned j = k / 2; j > 0; j /= 2) {
9:              unsigned ixj = tid ^ j;
10:             if (ixj > tid) {
11:                 if ((tid & k) == 0)
12:                     if (shared[tid] > shared[ixj])
13:                         swap(shared[tid], shared[ixj]);
14:                 else
15:                     if (shared[tid] < shared[ixj])
16:                         swap(shared[tid], shared[ixj]);
17:             }
18:             __syncthreads( );
19:         }
20:
21:     // Write result.
22:     values[tid] = shared[tid];
    }
```

A way to test this kernel is, as in the CUDA SDK 2.0, to use a random input value. Unfortunately this cannot tell whether the kernel is correct for other values. Furthermore, random inputs may miss some important paths of the program, e.g. the two branches of the condition shared[tid]>shared[ixj] is not explored fully. Moreover, it is undocumented that this kernel works only if bdim.x is a power of two (so-called valid configurations). To thoroughly check this kernel, particular embodiments may help:
  prove that the kernel is correct (i.e. the output array is sorted) for any input in a valid configuration;
  automatically produce a set of high-quality test cases to be used in the real settings (e.g. for testing the execution or measuring the performance in hardware);
  identify undocumented requirements, e.g. what configurations are valid.

In particular, CKLEE meets these requirements using symbolic execution. In this paper, particular embodiments show that it can help detect bugs introduced during kernel design and produce concrete test cases for achieving high (line and branch) coverage.

Even if a kernel passes the sanity check (i.e. no deadlocks and races) and the functional correctness check (i.e. the postcondition will never be violated), it may still be useful to produce test cases to test its execution in a real GPU. For example, it may be beneficial to determine whether the verified kernel works on newly released GPUs or to measure the performance of a verified kernel in terms of bank conflicts and memory coalescing.

In particular embodiments, symbolic execution is a program-analysis technique that starts the execution of a program on symbolic, rather than concrete, inputs and computes the effect on the program of these symbolic inputs using symbolic expressions. Symbolic execution characterizes each path it explores with a path condition defined as a conjunction of Boolean expressions. Each Boolean expression denotes one branching decision made during the execution of a distinct path of the program under test.

For example, consider the branch at line 12 of the Bitonic Sort kernel. The condition shared[tid]>shared[ixj] may or may not be satisfied, generating two possible paths from that point. Traditional testing of this kernel involves assigning some concrete values to the input values and executing the code. It will exercise only one path through the code, thus this condition can have only one value—either true or false, but not both. In contrast, symbolic execution assigns a symbolic value to the input and analyzes all the two possible paths associated with this condition. When the execution is finished, multiple path conditions may be generated, each corresponds to a feasible execution path of the code with respect to the symbolic input. The solutions to these conditions are the test inputs.

In particular embodiments, CKLEE is based on a symbolic execution tool, called KLEE, designed for the symbolic execution of sequential C programs. In particular embodiments, KLEE functions as a hybrid between an operating system for symbolic states and an interpreter. Each symbolic state has a register file, stack, heap, program counter, and path condition. Programs are compiled to the LLVM assembly language, a Reduced Instruction Set Computing (RISC)-like virtual instruction set. KLEE directly interprets this instruction set and maps instructions to constraints without approximation (i.e. bit-level accuracy).

In particular embodiments, KLEE runs programs symbolically and generates constraints that exactly describe the set of values possible on a given path. When KLEE detects an error or when a path reaches an exit call, KLEE solves the current path âĂŹ constraints (called its path condition) to produce a test case that will follow the same path when rerun on an unmodified version of the checked program (e.g. compiled with GCC).

In particular embodiments, in KLEE, storage locations for a state âĂŤ registers, stack, and heap objects âĂŤ refer to expressions (trees) instead of raw data values. When an instruction is executed, the code that builds expressions checks if all given operands are concrete (i.e. constants) and, if so, performs the operation natively, returning a constant expression.

In particular embodiments, KLEE employs a variety of constraint solving optimizations, represents program states compactly, and uses search heuristics to get high code coverage. KLEE may be used to check system utility programs as those in Unix. In particular embodiments, KLEE is a good basis for a symbolic executor for more advanced computation models.

In particular embodiments, CKLEE extends the KLEE symbolic virtual machine to handle concurrent programs (e.g. CUDA kernels). It augments the symbolic state to model CUDA's memory hierarchy. To handle multi-threaded programs CKLEE's interpreter applies deterministic thread scheduling with sanity checking for concurrency bugs.

A symbolic state in CKLEE models machine execution state of the CPU. In particular, the memory hierarchy of CUDA is built in the symbolic states. In a state, each thread (in a block) has its own stack and local memory, plus a path condition; each block has a shared memory. All blocks can access the device memory in the GPU and the main memory in the CPU. The example GPU in FIG. 2 has a grid size of n×m and a block size of k. Shared components (e.g. shared memories and the device memory) are shared by multiple threads. A register stores a concrete value or a symbolic expression. Mimicking the machine stack, a symbolic stack consists of multiple frames. A memory is organized as objects, each of which has a concrete address and an array of bytes recording the value. If a pointer can refer to multiple objects, the current state is cloned for each object, i.e. a new path is generated for each possible reference (whether a symbolic pointer can point to an object or not is determined by SMT solving). Although this method can be expensive for pointers with large points-to sets, typical CUDA programs use only symbolic pointers that refer to a single object, and CKLEE is well optimized for this case. On the other hand, after a source program is compiled into bytecode, it may be difficult to resolve which memory is used when an access is made because the address of this access may be calculated by multiple bytecode instructions.

When executing the bytecode, particular embodiments need to know which memory a variable is in. For this, particular embodiments give a (possibly symbolic) expression a type $\mathcal{T}$ which is either $\mathcal{T}\_$ (unknown), $\mathcal{T}_l$ (local), $\mathcal{T}_s$ (shared), $\mathcal{T}_d$ (device), $\mathcal{T}_h$ (host), or $\mathcal{T}_c$ (constant, irrelevant to any memory). Particular embodiments describe briefly how to infer such types when memory accesses are made. An instruction I has type rule $\vdash I:\Sigma \rightarrow \Sigma'$, which indicates that it changes type environment $\Sigma$ to $\Sigma'$. Notations $\Sigma[e]$ and $\Sigma \cup (e, \tau)$ stand for reading the type of e and setting e's type to $\mathcal{T}$ respectively. $\Sigma$ contains a map of expressions e to its memory type $\mathcal{T}$. It also records the information of memory objects: each object m has a memory address a and a width w, e.g. m.a gives m's starting address. Example inference rules are shown below. The first one specifies that $e_2$'s type is obtained from $e_1$'s. In many cases $e_1$ is a pointer to an array whose type is known at the compile time. The next two rules are about binary operations: if both operands have the same type or one of them is a constant, then the result has this type too. Otherwise, the result's type is unknown. The fourth is for handling expressions with unknown types. A valid type is found for e if there exists a memory object m such that e's value falls between [m.a, m.a+m.w]. If e can refer to multiple objects (determined by SMT solving), then multiple states are generated.

$$\frac{\Sigma[e_1] = \tau}{\vdash e_2 = getelementptr\ e_1, \ldots\ : \Sigma \rightarrow \Sigma \cup (e_2, \tau)}$$

$$\frac{\Sigma[e_1] \in \{\tau, \tau_c\}, e_2 \in \{\tau, \tau_c\}}{\vdash e = binop\ e_1 e_2 : \Sigma \rightarrow \Sigma \cup (e, \tau)}$$

$$\frac{\Sigma[e_1] = \tau_1 \Sigma[e_2] = \tau_2 \tau_1 \neq \tau_2}{\vdash e = binop\ e_1 e_2 : \Sigma \rightarrow \Sigma \cup (e, \tau\_)}$$

$$\frac{\Sigma[e] = \tau\_ \exists m \in \Sigma : m.a <= e < m.a + m.w}{\Sigma[e] = m.\tau}$$

Consider the following instructions. Suppose register % a refers to array a in the shared memory; then $\Sigma[\%\ 2] = \mathcal{T}_s$ and $\Sigma[\%\ 3] = \mathcal{T}_s$, thus the load instruction will access the shared memory (pertaining to the block the current thread is in). When such analysis fails particular embodiments need to search the memory hierarchy to locate the target memory.

% 2=getelementptr inbounds i32*% a,i64% 1

% 3=add i32 4,% 2

% 4=load i32*% 3,align 4

In general, an executor of concurrent programs needs to explore the schedules/interleavings of multiple threads in order not to miss cases. In particular embodiments, CKLEE's scheduling is based on an observation that CUDA programmers often intend to write deterministic programs with final results that are independent of the concurrent schedule. Thus analysis methods that also try to avoid having to generate schedules may be useful. In the "increment GPU" example above, the output value in b is the same for all possible schedules since the accesses on b and a are not conflicting (i.e. not incurring a race). On the other hand, this conclusion is not true when a race occurs. For example, consider running the "race" kernel above using two threads. The following two schedules produce different output values:

| Initially v[0] = a, v[1] = b | |
| --- | --- |
| schedule 1 | schedule 2 |
| $t_0$ reads b from v[1] | $t_1$ reads a from v[0] |
| $t_1$ reads a from v[0] | $t_1$ writes a into v[1] |
| $t_0$ writes b into v[0] | $t_0$ reads a from v[1] |
| $t_1$ writes a into v[1] | $t_0$ writes a into v[0] |
| now v[0] = b, v[1] = a | v[0] = a, v[1] = a |

The following theorem indicates that we need to only investigate one schedule for a race-free program:

THEOREM 1 (SERIALIZABILITY). If each pair of accesses to shared variables doesn't incur a race, then the entire code containing these accesses is race free and can be serialized such that only one schedule needs to be explored.

In particular embodiments, CKLEE implements such race checks and is able to eliminate generating concurrency schedules. As described below, this technique may be applied to programs that are decomposed in terms of barrier intervals.

CUDA intra-block thread executions exhibit a regular pattern: $\{t_0, \ldots, t_n\}$ execute→barrier→$\{t_0, \ldots, t_n\}$ execute→ . . . . Since an access before a barrier will never conflict with an access after this barrier, particular embodiments may focus on the accesses between two consecutive barriers (so called a barrier interval or BI). If the accesses in a BI are non-conflicting, particular embodiments build a transition constraint by serializing (sequentializing) them; then particular embodiments move on to the next BI and hope to repeat this treatment. This approach provides deterministic thread scheduling over multiple BIs.

Figure 3:
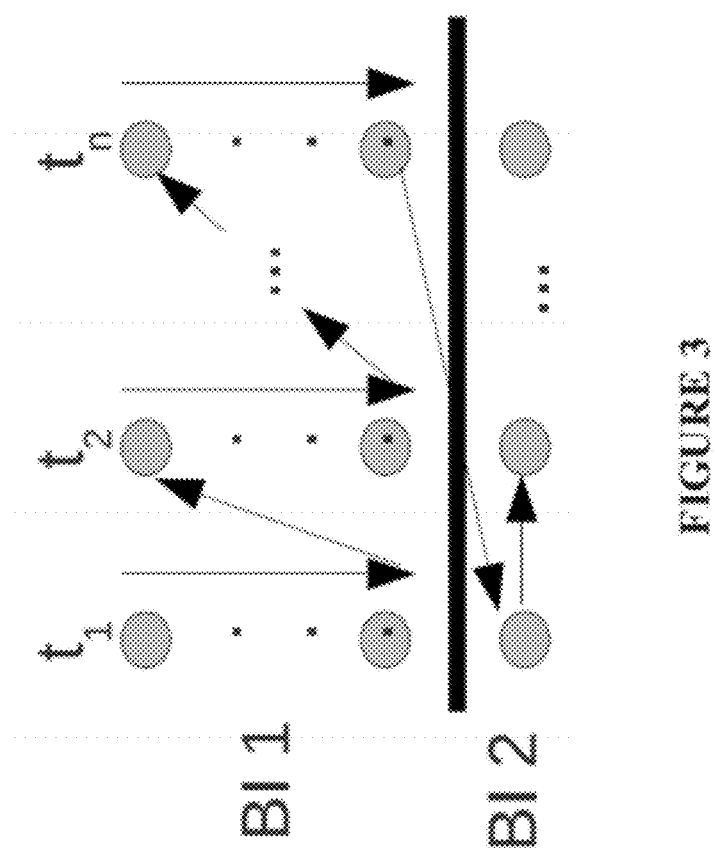
FIG. 3 illustrates an example thread-scheduling order.

In particular embodiments, CKLEE assigns serial numbers (SNs) to the threads to indicate their execution order within a BI. SNs are used to scheduled the execution of the threads within a block or in different blocks. FIG. 3 illustrates an example thread-scheduling order. In FIG. 3, within a BI, the threads in block 0 execute first, followed by the threads in block 1, and so forth. In each block, thread 0 executes first, followed by thread 1, and so on. Herein, thread i refers to the thread with SN i. When all the threads in a BI finishes, the next BI starts execution.

In particular embodiments, CKLEE inherits KLEE's ability to check common errors in sequential C program, such as out-of-bound memory access, divide-by-zero, etc. In particular embodiments, CKLEE can also check concurrency bugs.

Particular embodiments check whether all barriers are well-synchronized—mismatched barriers will incur deadlocks. This also influences the determination of whether races occur. The sanity check is performed when the symbolic execution encounters a barrier (there may be an implicit barrier at the end of a kernel).

Consider first the "deadlock" example above. At first glance, this appears ill-synchronized: a thread may take the path corresponding to the true branch while another may take the path encountering no barriers. However, it is possible that all threads make the same decision on the condition. The use of symbolic techniques in particular embodiments can determine whether these paths are feasible, if so, and flag an error. In particular embodiments, to checking for well synchronized barriers, CKLEE examines whether all threads have executed the same number of barriers: $\forall t_i, t_j : bar_{t_i} = bar_{t_j}$, where $bar_t$ stands for the number of barriers $t_i$ has encountered. The decision is made when a thread finished the execution of the kernel.

Figure 4:
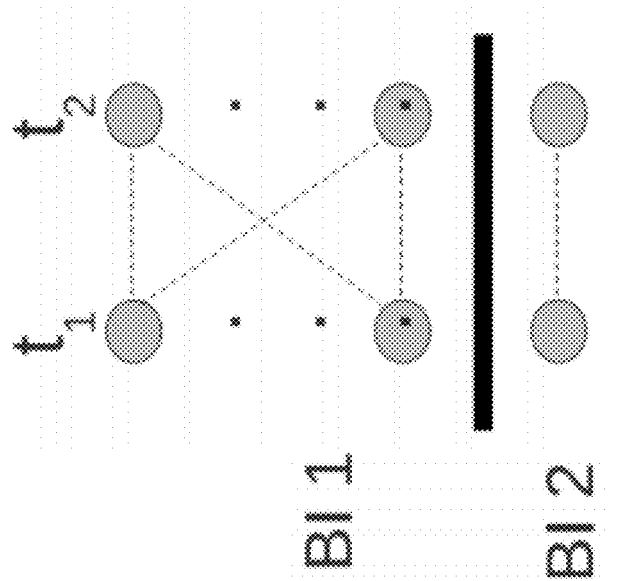
FIG. 4 illustrates example conflict checking.

In particular embodiments, races are checked over a BI as FIG. 4 illustrates, where the nodes denote the accesses and dotted lines denote the possible conflicts. Particular embodiments record all the reads and writes to shared variables (including those in the Device Memory and CPU Memory) into a Read Set $\mathbb{R}$ and a Write Set $\mathbb{W}$, respectively. If a write in $\mathbb{W}$ conflicts with another write in $\mathbb{W}$ or any read in $\mathbb{R}$, , then a race is found. Since the address of an access may be a complex expression involving symbolic variables, particular embodiments consult the SMT solver to check whether the addresses might overlap. Consider the running "race" kernel. A race occurs on v[0] by thread 0 and thread bdim.x−1 (note that bdim.x can have symbolic value and bdim.x=2 will result in another race):

thread 0 thread $bdim.x-1$ $\mathbb{R} = \{v[1]\}$ $\mathbb{R} = \{v[0]\}$ $\mathbb{W} = \{v[0]\}$ $\mathbb{W} = \{v[bdim.x-1]\}$ Particular embodiments perform conflict checking at the byte level (rather than the word level). Suppose a thread read $n_1$ bytes starting from address $a_1$ and another thread write $n_2$ bytes starting from address $a_2$. Then an overlap exists if and only if the following constraint holds:

$(a_1 \leq a_2 \wedge a_2 < a_1 + n_1) \vee (a_2 \leq a_1 \wedge a_1 < a_2 + n_2)$ Particular embodiments may perform intra-block race checks when the last thread reaches a barrier. Particular embodiments may check races on the device memory and the host (or CPU) memory when all threads finish executing the kernel, since accesses to these memories are not synchronized by the barriers. In contrast to static analysis methods that do not apply decision procedures or that rely heavily on abstractions, particular embodiments report accurate more results.

In particular embodiments, CKLEE generates a test case for a path along which all the branches are feasible with respect to the symbolic input. For a conditional branch, CKLEE may query the constraint solver to determine if the branch condition is either provably true or provably false along the current path. If so, CKLEE may update the instruction pointer to the appropriate location. Otherwise, both branches are possible. CKLEE may clone the state to explore both paths, updating the instruction pointer and path condition on each path appropriately. Particular embodiments calculate the feasibility of a path by SMT solving. Given a path $c_1; c_2; \ldots, c_n$ and a branch condition $c_n+1$, a new path corresponding to the true case of $c_n+1$ is generated only if condition $c_1 \wedge c_2 \wedge \ldots \wedge c_n$ is satisifiable.

Consider the Bitonic Sort kernel. Suppose the input values is of size 4 and has symbolic value v, and the execution uses one block with four threads. Lines 1-4 copy the input to shared which is in the shared memory: $\forall i \in [0,3]: shared[i] = v[i]$. Now consider thread 0. Since lines 7-8 involve no symbolic values, they are executed concretely. In the first iteration of the inner loop, particular embodiments have k=2, j=1, and ixj=1. The conditional branch at line 10 is evaluated to be true; so does that at line 11. Then the execution reach the branch at line 12.

In particular embodiments, CKLEE queries the constraint solver to determine that, for this branch, both shared[0]>shared[1] and shared[0]≤shared[1] are not either provably true or provably false, thus both branches are possible. CKLEE clones the state so as to explore both paths. The path conditions of two next states are shared[0]>shared[1] and shared[0]≤shared[1] respectively. Then the executor starts the next iteration of the loop. The execution terminates with 28 paths, each of which leads to a test case. The path condition of one case is shown below. The solver returns {7, 6, 0, 4} as the input corresponding to this path.

$v[1] < v[0] \wedge v[2] < v[3] \wedge v[3] \geq v[1]$

In addition to these test case, the executor has verified that there exist no deadlocks and races, and the following post condition holds for all possible inputs (not just the generated 28 inputs):

for (int $i=1; i<NUM; i++$)

assert(values[$i$]<values[$i-1$]);

The Bitonic Sort example illustrates that there may be a large number of paths generated for branch intensive programs. Particular embodiments reduce this number while keeping core paths and maintaining good coverage. Particular embodiments use reduction heuristics based on a typical computation model of CUDA: within a BI, a thread fetches data from its neighbors, performs the operation, then writes the result back to the shared memory. Threads may employ a variety of indexing techniques, such as linear indexing or tree indexing, to access their neighbors' data. A feature of CUDA's single instruction, multiple data (SIMD) model is that all the threads execute the same operations (modulo the branch decisions), but on different data. Hence, a bug can often be revealed by executing the paths relevant to only one representative thread. Particular embodiments group the threads together with respect to some criteria and, for each group, particular embodiments pick one thread to explore its branches fully. Such a thread is called core thread. A user can specify a strategy to pick core threads, e.g. threads with IDs 0, 1, 2, 4, . . . . To obtain test cases reflecting as larger portion of the input as possible, in particular embodiments, the paths access new portions of the data.

Particular embodiments connect multiple BIs by corner accesses. If a condition is explored fully, i.e. both branches are explored, then all the accesses involved in this condition are tagged corner. In the following BIs, when a branch involves a corner access, it will be fully explored; otherwise one of its branches is picked randomly and explored.

Figure 5:
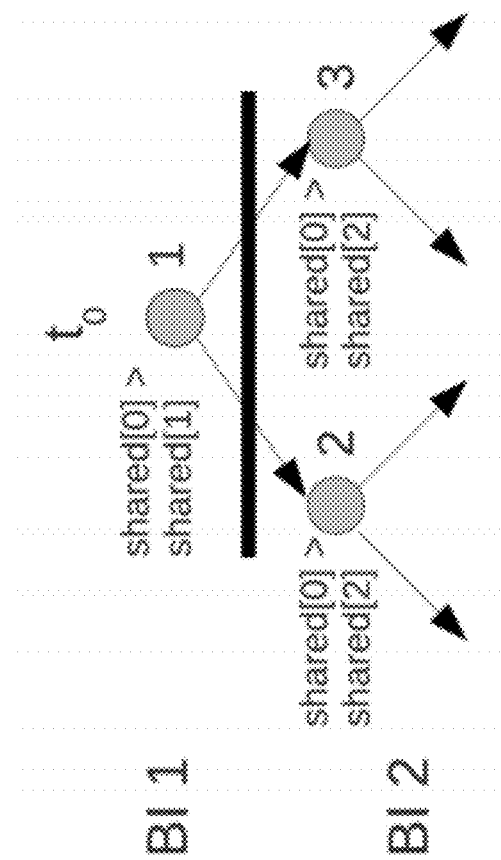
FIG. 5 illustrates an example application of heuristics.

FIG. 5 illustrates an example application of heuristics on the Bitonic Sort example. Thread $t_0$ is a core thread. Thus, branches are explored fully and marked shared[0] and shared [1] as corner accesses. In BI 1, thread $t_1$ involves no branches on shared variable shared. In BI 2, its first branch accesses shared[1], thus is explored fully. Such computation goes on until the entire kernel finished execution.

As described above, FIG. 1 illustrates an example flow for symbolic execution and test generation for a GPU program. A GPU program, along with a driver, is compiled into Low Level Virtual Machine (LLVM) bytecode, which CKLEE interprets for symbolic execution. Particular embodiments extend the LLVM-GNU Compiler Collection (GCC) compiler to handle GPU program syntax. After the execution, statistics information, such as bytecode coverage, may be provided. In particular embodiments, one output provides information about sanity and functional correctness (if defined). Another output is the test cases, which may be replayed to produce coverage information. gcov may produce the coverage information.

The user may input a file a kernel together with a driver representing the main (CPU side) program. To cater for the need of LLVM-GCC, particular embodiments redefine some CUDA specific functions, e.g.:

```
#define cutilSafeCall(f) f
void cudaMalloc(void** devPtr, size_t size) {
   *devPtr = malloc(size);
}
void cudaMemcpy(void* a, void* b, size_t size, ...)
{ memcpy(a,b,size); };
```

Below, an example driver for the Bitonic Sort kernel is shown. The user specifies what input values should have symbolic values. The user may place assert assertions anywhere in the code, which will be checked during analysis. Particularly, the pre- and post-conditions are specified before and after the GPU code respectively. Function_begin_GPU (NUM) specifies that the x dimension of the block size is NUM.

```
int main( ) {
   int values[NUM];
   cklee_make_symbolic(values, NUM, "input");
   int* dvalues;
   cutilSafeCall(cudaMalloc((void**)&dvalues,
         sizeof(int)*NUM));
   cutilSafeCall(cudaMemcpy(dvalues, values,
         sizeof(int)*NUM, cudaMemcpyHostToDevice));
   // <<<...>>>(BitonicKernel(dvalues))
   __begin_GPU(NUM);         // block size = <NUM>
   BitonicKernel(dvalues);
   __end_GPU( );
   // the post-condition
```

```
   for (int i = 1; i < NUM; i++)
      assert(dvalues[i] < dvalues[i−1]);
   cutilSafeCall(cudaFree(dvalues));
}
```

Because, in particular embodiments, CKLEE simulates both the GPU and CPU, particular embodiments mix the computation of the CPU and GPU, e.g. execute multiple kernels in a sequence:

CPU code; GPU code; CPU code; GPU code; . . . .

To make LLVM-GCC to parse the CUDA directives, particular embodiments use C attributes to interpret them, as illustrated by the following definition of_shared_:

```
#define ___shared___
      __attribute((section ("___shared___")))
```

In particular embodiments, the GPU configuration may be specified at the command line. For instance, option–block-size=[4, 2] indicates that each block is of size 4×2. These values may also be made symbolic to reveal configuration limitations.

Figure 6:
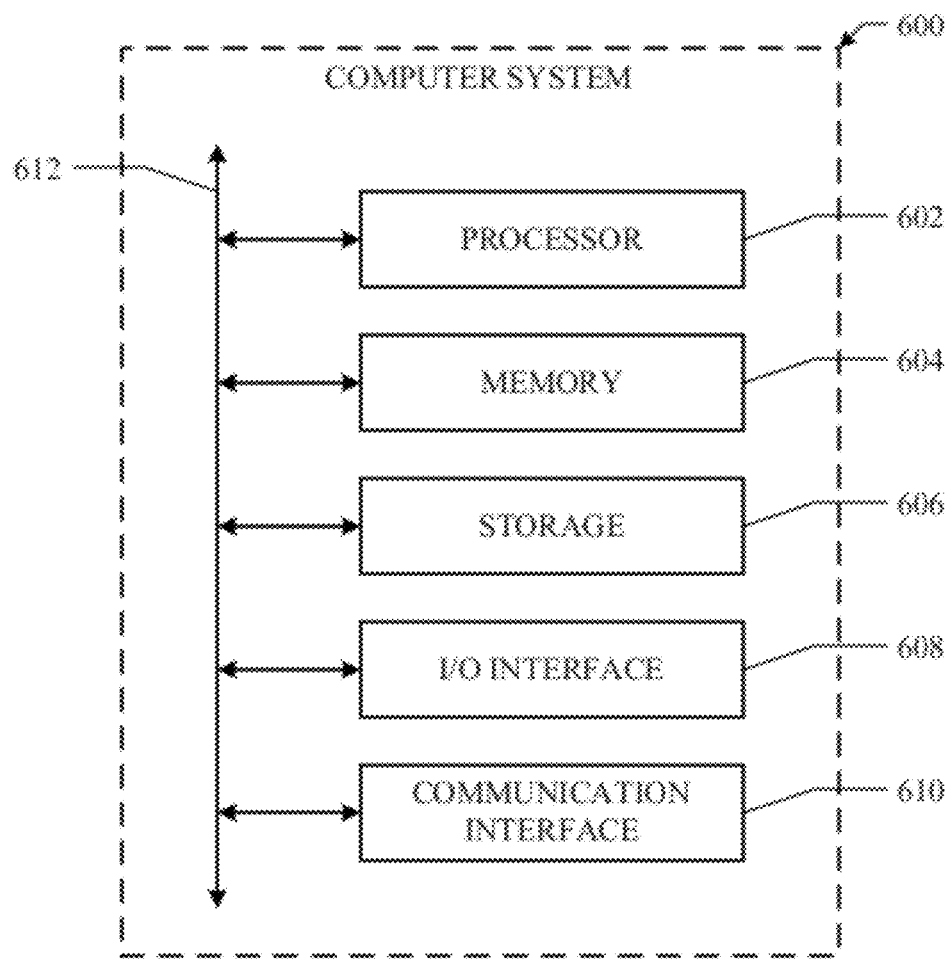
FIG. 6 illustrates an example computer system.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple datacenters; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, reference to a computer-readable storage medium encompasses one or more non-transitory, tangible computer-readable storage media possessing structure. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. Herein, reference to a computer-readable storage medium excludes any medium that is not eligible for patent protection under 65 U.S.C. §101. Herein, reference to a computer-readable storage medium excludes transitory forms of signal transmission (such as a propagating electrical or electromagnetic signal per se) to the extent that they are not eligible for patent protection under 65 U.S.C. §101. A computer-readable non-transitory storage medium may be volatile, non-volatile, or a combination of volatile and non-volatile, where appropriate.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Figure 7:
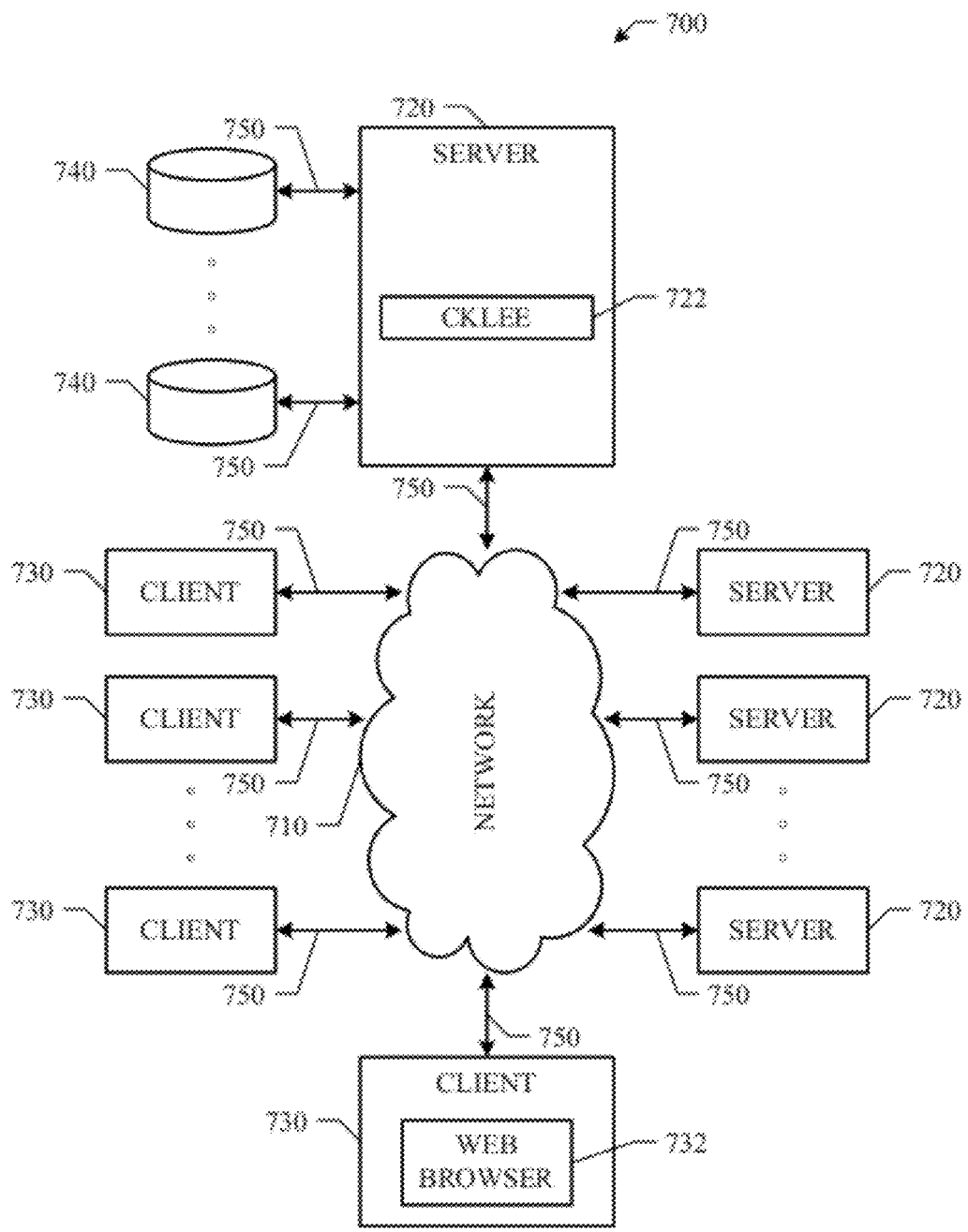
FIG. 7 illustrates an example network environment.

FIG. 7 illustrates an example network environment 700. This disclosure contemplates any suitable network environment 700. As an example and not by way of limitation, although this disclosure describes and illustrates a network environment 700 that implements a client-server model, this disclosure contemplates one or more portions of a network environment 700 being peer-to-peer, where appropriate. Particular embodiments may operate in whole or in part in one or more network environments 700. In particular embodiments, one or more elements of network environment 700 provide functionality described or illustrated herein. Particular embodiments include one or more portions of network environment 700. Network environment 700 includes a network 710 coupling one or more servers 720 and one or more clients 730 to each other. This disclosure contemplates any suitable network 710. As an example and not by way of limitation, one or more portions of network 710 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 710 may include one or more networks 710.

Links 750 couple servers 720 and clients 730 to network 710 or to each other. This disclosure contemplates any suitable links 750. As an example and not by way of limitation, one or more links 750 each include one or more wireline (such as, for example, Digital Subscriber Line (DSL) or Data Over Cable Service Interface Specification (DOCSIS)), wireless (such as, for example, Wi-Fi or Worldwide Interoperability for Microwave Access (WiMAX)) or optical (such as, for example, Synchronous Optical Network (SONET) or Synchronous Digital Hierarchy (SDH)) links 750. In particular embodiments, one or more links 750 each includes an intranet, an extranet, a VPN, a LAN, a WLAN, a WAN, a MAN, a communications network, a satellite network, a portion of the Internet, or another link 750 or a combination of two or more such links 750. Links 750 need not necessarily be the same throughout network environment 700. One or more first links 750 may differ in one or more respects from one or more second links 750.

This disclosure contemplates any suitable servers 720. As an example and not by way of limitation, one or more servers 720 may each include one or more advertising servers, applications servers, catalog servers, communications servers, database servers, exchange servers, fax servers, file servers, game servers, home servers, mail servers, message servers, news servers, name or DNS servers, print servers, proxy servers, sound servers, standalone servers, web servers, or web-feed servers. In particular embodiments, a server 720 includes hardware, software, or both for providing the functionality of server 720. As an example and not by way of limitation, a server 720 that operates as a web server may be capable of hosting websites containing web pages or elements of web pages and include appropriate hardware, software, or both for doing so. In particular embodiments, a web server may host HTML or other suitable files or dynamically create or constitute files for web pages on request. In response to a Hyper Text Transfer Protocol (HTTP) or other request from a client 730, the web server may communicate one or more such files to client 730. As another example, a server 720 that operates as a mail server may be capable of providing e-mail services to one or more clients 730. As another example, a server 720 that operates as a database server may be capable of providing an interface for interacting with one or more data stores (such as, for example, data stores 770 described below). Where appropriate, a server 720 may include one or more servers 720; be unitary or distributed; span multiple locations; span multiple machines; span multiple datacenters; or reside in a cloud, which may include one or more cloud components in one or more networks.

In particular embodiments, one or more links 750 may couple a server 720 to one or more data stores 740. A data store 740 may store any suitable information, and the contents of a data store 740 may be organized in any suitable manner. As an example and not by way or limitation, the contents of a data store 740 may be stored as a dimensional, flat, hierarchical, network, object-oriented, relational, XML, or other suitable database or a combination or two or more of these. A data store 740 (or a server 720 coupled to it) may include a database-management system or other hardware or software for managing the contents of data store 740. The database-management system may perform read and write operations, delete or erase data, perform data deduplication, query or search the contents of data store 740, or provide other access to data store 740.

In particular embodiments, one or more servers 720 may each include one or CKLEE modules 722. A CKLEE module 722 may include hardware, software, or both for providing the functionality described above with respect to symbolic execution and test generation for a GPU program. As an example and not by way of limitation, CKLEE module 722 (together with one or more other hardware or software components external or internal to CKLEE module 722) may compile a GPU program, along with a driver, into LLVM bytecode and interpret it for symbolic execution. After the execution, CKLEE module 722 may generate statistics information, such as bytecode coverage. In particular embodiments, one output of CKLEE module 22 may provide information regarding sanity and functional correctness (if defined). Another output may be the test cases, which may be replayed to produce coverage information.

In particular embodiments, one or more servers 720 may each include one or more data monitors/collectors 724. A data monitor/collection 724 may include hardware, software, or both for providing the functionality of data collector/collector 724. As an example and not by way of limitation, a data monitor/collector 724 at a server 720 may monitor and collect network-traffic data at server 720 and store the network-traffic data in one or more data stores 740. In particular embodiments, server 720 or another device may extract pairs of search queries and selected URLs from the network-traffic data, where appropriate.

This disclosure contemplates any suitable clients 730. A client 730 may enable a user at client 730 to access or otherwise communicate with network 710, servers 720, or other clients 730. As an example and not by way of limitation, a client 730 may have a web browser, such as MICROSOFT INTERNET EXPLORER or MOZILLA FIREFOX, and may have one or more add-ons, plug-ins, or other extensions, such as GOOGLE TOOLBAR or YAHOO TOOLBAR. A client 730 may be an electronic device including hardware, software, or both for providing the functionality of client 730. As an example and not by way of limitation, a client 730 may, where appropriate, be an embedded computer system, an SOC, an SBC (such as, for example, a COM or SOM), a desktop computer system, a laptop or notebook computer system, an interactive kiosk, a mainframe, a mesh of computer systems, a mobile telephone, a PDA, a netbook computer system, a server, a tablet computer system, or a combination of two or more of these. Where appropriate, a client 730 may include one or more clients 730; be unitary or distributed; span multiple locations; span multiple machines; span multiple datacenters; or reside in a cloud, which may include one or more cloud components in one or more networks.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising, by one or more computer systems:
   accessing bytecode generated by a compiler from a software program for execution by a particular processing unit that supports single-instruction-multiple-data (SIMD) execution;
   accessing configuration information describing one or more aspects of the particular processing unit;
   symbolically executing the bytecode with the configuration information, the symbolic execution comprising:
      assigning symbolic inputs to input variables of the software program;

determining one or more execution paths in the software program;

for each of the execution paths, constructing a symbolic expression that, if satisfied, causes the software program to proceed down the execution path, one or more of the symbolic expressions being based at least in part on the configuration information; and using the symbolic expressions, executing multiple threads in the bytecode according to a deterministic thread schedule, the deterministic thread schedule simulating SIMD execution;

based on the symbolic execution:

generating one or more results conveying a functional correctness of the software program with respect to the particular processing unit for communication to a user, each of the one or more results indicating a feasible execution path of the software program with respect to the symbolic input; and generating one or more test cases for the software program for communication to a user, each of the one or more test cases indicating values that satisfy a result of the one or more results.

2. The method of claim 1, wherein the particular processing unit is a Graphical Processing Unit (GPU) and the software program is at least in part a GPU software program.

3. The method of claim 1, wherein symbolically executing the bytecode with the configuration information comprises generating a symbolic virtual machine to handle the software program.

4. The method of claim 1, wherein the compiler is a Low Level Virtual Machine (LLVM) GNU Compiler Collection (GCC) compiler.

5. The method of claim 4, wherein the compiler comprises one or more extensions for parsing Compute Unified Device Architecture (CUDA) syntax.

6. The method of claim 1, wherein the software program comprises one or more Compute Unified Device Architecture (CUDA) kernels.

7. The method of claim 1, wherein the test cases are configured to be replayed to generate coverage information for the symbolic execution of the bytecode.

8. The method of claim 1, wherein, during the execution of the threads, race, deadlock, and synchronization checking are performed.

9. The method of claim 1, wherein the symbolic execution further comprises processing by Satisfiability Modulo Theories (SMT) solver path conditions for the execution paths.

10. One or more computer-readable non-transitory storage media embodying logic that is operable when executed to:

access bytecode generated by a compiler from a software program for execution by a particular processing unit that supports single-instruction-multiple-data (SIMD) execution;

access configuration information describing one or more aspects of the particular processing unit;

symbolically execute the bytecode with the configuration information, the symbolic execution comprising:

assigning symbolic inputs to input variables of the software program;

determining one or more execution paths in the software program;

for each of the execution paths, constructing a symbolic expression that, if satisfied, causes the software program to proceed down the execution path, one or more of the symbolic expressions being based at least in part on the configuration information; and using the symbolic expressions, executing multiple threads in the bytecode according to a deterministic thread schedule, the deterministic thread schedule simulating SIMD execution;

based on the symbolic execution:

generate one or more results conveying a functional correctness of the software program with respect to the particular processing unit for communication to a user, each of the one or more results indicating a feasible execution path of the software program with respect to the symbolic input; and generate one or more test cases for the software program for communication to a user, each of the one or more test cases indicating values that satisfy a result of the one or more results.

11. The media of claim 10, wherein the particular processing unit is a Graphical Processing Unit (GPU) and the software program is at least in part a GPU software program.

12. The media of claim 10, wherein the logic operable to symbolically execute the bytecode with the configuration information is further operable to generate a symbolic virtual machine to handle the software program.

13. The media of claim 10, wherein the compiler is a Low Level Virtual Machine (LLVM) GNU Compiler Collection (GCC) compiler.

14. The media of claim 13, wherein the compiler comprises one or more extensions for parsing Compute Unified Device Architecture (CUDA) syntax.

15. The media of claim 10, wherein the software program comprises one or more Compute Unified Device Architecture (CUDA) kernels.

16. The media of claim 10, wherein the test cases are configured to be replayed to generate coverage information for the symbolic execution of the bytecode.

17. The media of claim 10, wherein, during the execution of the threads, race, deadlock, and synchronization checking are performed.

18. The media of claim 10, wherein the symbolic execution further comprises processing by Satisfiability Modulo Theories (SMT) solver path conditions for the execution paths.

19. An apparatus comprising:

one or more memory devices containing one or more instructions for execution by one or more processing devices; and the processing devices, operable when executing the instructions to:

access bytecode generated by a compiler from a software program for execution by a particular processing unit that supports single-instruction-multiple-data (SIMD) execution;

access configuration information describing one or more aspects of the particular processing unit;

symbolically execute the bytecode with the configuration information, the symbolic execution comprising:

assigning symbolic inputs to input variables of the software program;

determining one or more execution paths in the software program;

for each of the execution paths, constructing a symbolic expression that, if satisfied, causes the software program to proceed down the execution path, one or more of the symbolic expressions being based at least in part on the configuration information; and using the symbolic expressions, executing multiple threads in the bytecode according to a deterministic thread schedule, the deterministic thread schedule simulating SIMD execution;

based on the symbolic execution:
generate one or more results conveying a functional correctness of the software program with respect to the particular processing unit for communication to a user, each of the one or more results indicating a feasible execution path of the software program with respect to the symbolic input; and generate one or more test cases for the software program for communication to a user, each of the one or more test cases indicating values that satisfy a result of the one or more results.

20. The apparatus of claim 19, wherein the particular processing unit is a Graphical Processing Unit (GPU) and the software program is at least in part a GPU software program.

21. The apparatus of claim 19, wherein the processing devices operable to symbolically execute the bytecode with the configuration information is further operable to generate a symbolic virtual machine to handle the software program.

22. The apparatus of claim 19, wherein the compiler is a Low Level Virtual Machine (LLVM) GNU Compiler Collection (GCC) compiler.

23. The apparatus of claim 22, wherein the compiler comprises one or more extensions for parsing Compute Unified Device Architecture (CUDA) syntax.

24. The apparatus of claim 19, wherein the software program comprises one or more Compute Unified Device Architecture (CUDA) kernels.

25. The apparatus of claim 19, wherein the test cases are configured to be replayed to generate coverage information for the symbolic execution of the bytecode.

26. The apparatus of claim 19, wherein, during the execution of the threads, race, deadlock, and synchronization checking are performed.

27. The apparatus of claim 19, wherein the symbolic execution further comprises processing by Satisfiability Modulo Theories (SMT) solver path conditions for the execution paths.

28. A system comprising:

means for accessing bytecode generated by a compiler from a software program for execution by a particular processing unit that supports single-instruction-multiple-data (SIMD) execution;

means for accessing configuration information describing one or more aspects of the particular processing unit;

means for symbolically executing the bytecode with the configuration information, the symbolic execution comprising:
assigning symbolic inputs to input variables of the software program;

determining one or more execution paths in the software program;

for each of the execution paths, constructing a symbolic expression that, if satisfied, causes the software program to proceed down the execution path, one or more of the symbolic expressions being based at least in part on the configuration information; and using the symbolic expressions, executing multiple threads in the bytecode according to a deterministic thread schedule, the deterministic thread schedule simulating SIMD execution;

means for, based on the symbolic execution, generating one or more results conveying a functional correctness of the software program with respect to the particular processing unit for communication to a user, each of the one or more results indicating a feasible execution path of the code with respect to the symbolic input; and means for, based on the symbolic execution, generating one or more test cases for the software program for communication to a user, each of the one or more test cases indicating values that satisfy a result of the one or more results.

* * * * *